United States Patent [19]
Dietz et al.

[11] Patent Number: 5,157,376
[45] Date of Patent: Oct. 20, 1992

[54] METHOD AND DEVICE FOR MONITORING DIRECTION INDICATOR LIGHTS OF A VEHICLE TRAILER

[75] Inventors: Jürgen Dietz, Weinstadt; Dieter Bräunig, Stuttgart, both of Fed. Rep. of Germany

[73] Assignee: Mercedes-Benz AG, Fed. Rep. of Germany

[21] Appl. No.: 680,146

[22] Filed: Apr. 3, 1991

[30] Foreign Application Priority Data

Apr. 4, 1990 [DE] Fed. Rep. of Germany ....... 4010765

[51] Int. Cl.$^5$ ............................................. B60Q 11/00
[52] U.S. Cl. .................................. 340/458; 340/642; 307/10.8
[58] Field of Search ............... 340/458, 431, 642, 641; 307/10.8, 9.1

[56] References Cited

U.S. PATENT DOCUMENTS

| | | | |
|---|---|---|---|
| 4,105,996 | 8/1978 | Shimizu | 346/642 |
| 4,348,655 | 9/1982 | Goettler et al. | 340/458 |
| 4,723,095 | 2/1988 | Svazas et al. | 307/10.8 |
| 4,910,496 | 3/1990 | Hatanaka et al. | 340/458 |
| 5,030,938 | 7/1991 | Bondzeit | 340/458 |

FOREIGN PATENT DOCUMENTS

2753528 6/1979 Fed. Rep. of Germany .
3038464 3/1983 Fed. Rep. of Germany .
3522481 3/1986 Fed. Rep. of Germany .
3622567 1/1988 Fed. Rep. of Germany .
3531560 11/1989 Fed. Rep. of Germany .

Primary Examiner—Jin F. Ng
Assistant Examiner—Nina Tong
Attorney, Agent, or Firm—Evenson, Wands, Edwards, Lenahan & McKeown

[57] ABSTRACT

Monitoring of trailer indicator lights includes a flasher pulse generator provided for generating, upon the switching on of a direction signalling switch, fixed pulse frequencies which can be changed over as a function of deviations of the load connected to the flasher pulse generator from its nominal load. The monitoring is carried out without requiring a change over of the flasher pulse generator to a "trailer mode" of operation. When the trailer is electrically connected, and upon the failure of one of the trailer indicator lights which are to be switched on and operated via a separate voltage supply at the frequency of the flasher pulse generator, one of the indicator lights of the towing vehicle is isolated from the electrical load of the flasher pulse generator. As a result of this simulated light failure, the frequency generated by the flasher pulse generator is changed over the imminent generation of a control signal to the vehicle driver. Because the isolated indicator light is actually intact, it continuous to be operated via an auxiliary switching device and is automatically switched on. The vehicle driver can therefore clearly recognize that a trailer indicator light has failed.

18 Claims, 2 Drawing Sheets

METHOD AND DEVICE FOR MONITORING DIRECTION INDICATOR LIGHTS OF A VEHICLE TRAILER

BACKGROUND AND SUMMARY OF THE INVENTION

The invention relates to a method and device for monitoring direction indicator lights of a vehicle trailer (trailer indicator lights) and, more particularly, to a device which, upon the failure of a trailer indicator light, generates an imminent failure signal in the towing vehicle. The imminent failure signal is generated by a significant change in the pulse frequency generated from a flasher pulse generator upon the switching on of a direction signalling switch when the electrical load of the flasher pulse generator, connected through the direction signalling switch, deviates from its nominal load.

A generic device as shown in Prior Art FIG. 1 is known from use in vehicles, e.g., those manufactured by the assignee of the present invention, having trailer coupling and electrical trailer plug-in connections. The device includes a flasher pulse generator for generating fixed clock frequencies which can be changed over as a function of its electrical load. The electrical load can be connected via a direction signalling switch and is formed at least by the indicator lights of the towing vehicle. A detection device detects whether a trailer is electrically connected or not and generates a corresponding electrical detection signal. A switching device, which is controllable by the electrical detection signal, automatically controls the flasher pulse generator in order to change it over to another pulse frequency on the failure of one of the connected trailer indicator lights. This change-over generates an imminent failure signal.

In the case of a series installation of the known device, the nominal load of a flasher pulse generator can be changed over by a detection device to trailer operation. The pulse frequency of the flasher pulse generator can be changed as a function of the effective load. This means that there are additional indicator lights to control and to monitor. The detection device electrically detects whether a trailer is electrically connected or not. The trailer indicator lights then form a part of the effective electrical load of the flasher pulse generator so that even the failure of an indicator light in the trailer is imminently signalled by a significant frequency change of the pulse generator. As a result, an electrical switching device is formed for automatically switching over the frequency generated by the flasher pulse generator on the failure of one of the connected indicator lights of the trailer. The electrical switching device is electrically controllable by the detection device.

A necessary prerequisite for this operation, however, requires that at least one signalling line be laid between the detection device and the flasher pulse generator. Via the signalling line, an unambiguous detection signal for switching over the nominal load of the flasher pulse generator is conducted. The detection device is looped into the brake light current path to the trailer. The detection device detects, already on the electrical connection of the trailer provided with at least two brake lights to the towing vehicle, the different potential difference "potential-free" or "circuit connected via brake lights to ground." Detection devices of this kind are also known from DE 35 22 481 C1 and DE 30 38 464 C2.

Since automatic monitoring of the trailer indicator lights is legally prescribed, the above-mentioned signalling line must be laid between the then newly installed detection device and the existing flasher pulse generator, even when subsequently installing a trailer device. This was done so that the flasher pulse generator, as previously mentioned, can be changed over to trailer mode. However, this is time-consuming because the flasher pulse generator is located, for production reasons, in the front part of the vehicle while the detection device is installed in the rear part of the vehicle nearer to the mechanical trailer device.

Other types of monitoring circuits for the indicator system of a towing vehicle and trailer are also known from DE 27 53 528 A1 and DE 36 22 567 A1.

One known device indicates both the presence of an electrically connected trailer and the functioning of the indicator lights of this trailer by means of a control lamp which can be switched on in different operating modes. However, the frequency of the flasher pulse generator is not changed.

Another known device operates such that, on the failure of an indicator light of the towing vehicle or of the trailer, a control lamp which is otherwise switched on when the direction indicator signal is switched on, does not light up.

A third known test device described in DE 35 31 560 C2 for the indicator light signalling system of motor vehicles provides two control lamps. One control lamp indicates a failure of a towing vehicle indicator light and the other a failure of a trailer indicator light.

There is therefore needed a method for monitoring direction indicator lights of a vehicle trailer which dispenses with a nominal load change-over of the flasher pulse generator to trailer mode while maintaining the generation of an imminent failure signal by means of clock frequency change-over of the flasher pulse generator. Further, there is needed a device of a generic type, in particular for carrying out the above method in such a way that the subsequent installation of the electrical part of a trailer device in a towing vehicle can be simplified.

These needs are met by the present invention wherein operation of the trailer indicator lights occurs via an auxiliary switching device clocked with the frequency of the flasher pulse generator. The trailer indicator lights provide the load of a separate voltage supply. A fault switching signal is generated by a trailer indicator lights monitoring circuit not connected to the electrical load of the flasher pulse generator on the electrical detection of the failure of one of the trailer indicator lights and with the direction signalling switch switched on. Electrical isolation is achieved for at least one indicator light of the towing vehicle from the electrical load of the flasher pulse generator in the presence of the fault switching signal of the monitoring circuit for the purpose of simulating a deviation of the electrical load of the flasher pulse generator from the nominal load. Auxiliary operation of the isolated indicator light of the towing vehicle is achieved by means of the auxiliary switching device.

The method of the present invention simulates, upon the failure of one of the trailer indicator lights, a failure of a towing vehicle indicator light which, of course, is on the same side of the car-trailer combination as the failed trailer indicator light. Thus a load change occurs at the flasher pulse generator, due to which the latter then also generates a frequency which deviates significantly from the normal flasher frequency if the trailer indicator lights are not part of its electrical nominal load. A change-over of the flasher pulse generator to trailer mode with increased nominal load is thus made unnecessary. However, because the isolated towing vehicle indicator light is actually intact, it can continue to be operated via the same auxiliary switching device which pulses the trailer indicator lights. More specifically, it can be operated with the flasher pulse generator frequency provided on the failure of a trailer indicator light and switched on automatically. The vehicle user who searches for the source of the error can, therefore, clearly recognize with the direction signalling switch switched on the failure of the trailer indicator light.

The above-mentioned approval regulation is thus satisfied.

It should also be noted that the expression "separate" voltage supply was selected in order to make clear with a positive formulation that the trailer indicator lights are not a load of the flasher pulse generator. However, this only means that a separate positive terminal is provided for the trailer indicator lights and not that a voltage supply or source which is independent of the vehicle voltage source, e.g. accumulator or battery, has to be provided.

The present invention further provides a device including the connection of the trailer indicator lights to a separate voltage supply via a clocked auxiliary switching device, which can be switched on by means of the direction signalling switch in the presence of the detection signal. A monitoring circuit is provided for the trailer indicator lights for detecting a failure of one of these indicator lights in the presence of the detection signal and for generating a corresponding fault switching signal. Electrical isolation of at least one indicator light of the towing vehicle, switched on at the same time as the failed trailer indicator light, occurs from the electrical load of the flasher pulse generator upon the switching on of the direction signalling switch and in the presence of the fault switching signal of the corresponding monitoring circuit. As a result, the flasher pulse generator is controlled so as to change over the pulse frequency generated by it. Electrical connection of the isolated indicator light from the load of the flasher pulse generator to the separate voltage supply occurs via the auxiliary switching device.

In a very simple manner, the electrical isolation of the aforesaid towing vehicle indicator light from the electrical load of the flasher pulse generator can be connected by means of a break contact of a relay which is looped into the current path between the flasher pulse generator and this indicator light and which is controlled by the switching device.

Advantageously, this relay also has a make contact actuated at the same time as the break contact. The make contact connects the isolated indicator light to the clocked auxiliary device immediately after the isolation.

Of course, the relay can also merely have a simple three-way contact which alternately connects the downstream indicator light to the flasher pulse generator or to the auxiliary switching device.

The auxiliary switching device can contain, in an advantageous manner, a further relay which is clocked by the flasher pulse generator itself. Preventive measures will be taken to ensure that the electrical load of this relay does not bring about a frequency change-over. This further relay intermittently connects through its make contact the isolated indicator light to a separate voltage supply.

Other objects, advantages and novel features of the present invention will become apparent from the following detailed description of the invention when considered in conjunction with the accompanying drawings.

DETAILED DESCRIPTION OF THE DRAWINGS

Figure 1:
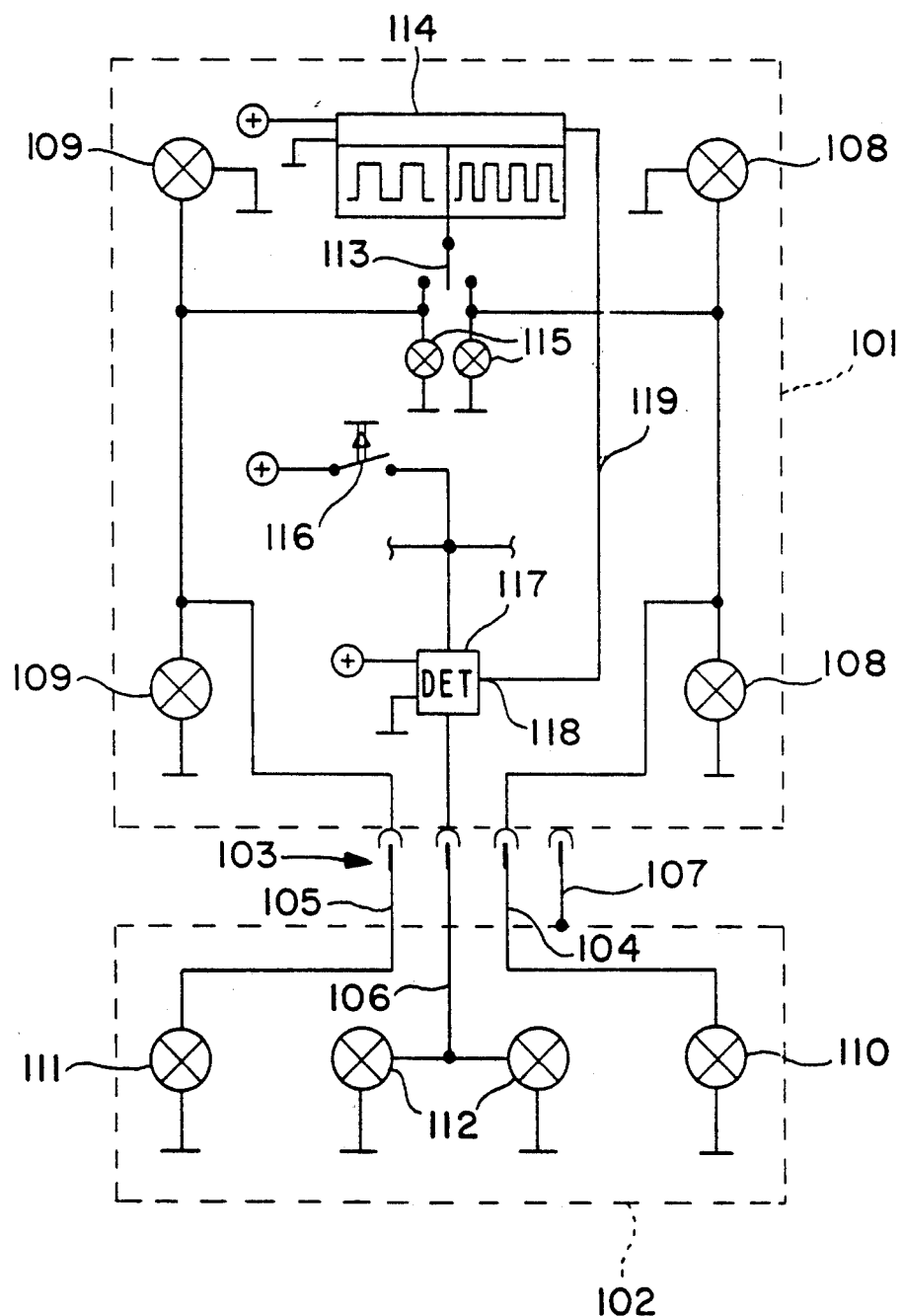
FIG. 1 is a simplified circuit diagram of a prior art device.

It should first be noted that the three-digit reference numerals include the figure number in the left-most position in order to differentiate the figures. As far as possible, the last two digits of the component reference numerals provided in both figures correspond to one another and are identical.

Referring to prior art FIG. 1, a towing vehicle 101 and a trailer 102 are coupled both mechanically (not shown) and electrically via a customary multipin plug-in connection 103. Of the plug-in connection 103, only two indicator light lines 104 and 105, a brake light line 106 and a grounding line 107 are illustrated. Of course, it is readily understood by those skilled in the art that other lines for lateral lights, etc. can also be provided.

The towing vehicle 101 has two right-hand indicator lights 108 and two left-hand indicator lights 109. The trailer 102 has in each case one right-hand indicator light 110 (connected via indicator light line 104 in parallel with the indicator lights 108) and one left-hand indicator light 111 (connected via indicator light line 105 in parallel with the indicator lights 109) as well as two brake lights 112 connected in parallel to each other. All the lights are connected on one side to ground.

By means of a customary, manually switchable three-way switch 113 (direction signalling switch) having a neutral center position, the right or left-hand indicator lights of towing vehicle 101 and trailer 102 can be optionally connected to the pulse output of a flasher pulse generator 114. In this circuit the trailer indicator lights 110 and 111 form a part of the electrical load of the flasher pulse generator 114. The flasher pulse generator 114 can generate two different pulse frequencies, as indicated by the signal symbols in FIG. 1, depending on the load connected, i.e. on the number of indicator lights. A relatively low frequency is generated in the case of intact indicator lights, e.g. a nominal load or nominal current drain by the indicator lights, and a significantly higher frequency is generated in the event of a failure of one or more indicator lights.

The flashing frequency, which is greater in a failure situation than in normal operation, is noticed by the vehicle user at least as a result of the unusually rapid flashing of one or two control lamps 115, connected in parallel to the indicator lights as an imminent fault/light failure signal. Of course, an audible signal source can also be provided.

The brake lights 112 of the trailer 102 and the brake lights (not illustrated) of the towing vehicle 101 are switched on via a brake light switch 116.

Looped into the connection between the brake light switch 116 and the brake lights 112 of the trailer 102 is a trailer detection device 117 having an output 118 to which a signalling line 119 coupled to the flasher pulse generator 114 is connected. The detection device 117 having its own voltage supply, differentiates independently of the switched-on state of the brake lights 112 between the "potential-free" and "via brake lights 112 to ground" states on the line 106. In the latter case, the detection device 117 sets the level on line 119 from "LOW" to "HIGH" and signals to the flasher pulse generator 114 by means of this detection signal that the trailer 102 is electrically connected.

This signal brings about an internal change-over in the flasher pulse generator 114 to a trailer mode of operation in which the nominal load is higher than in the case of a pure towing vehicle mode. A failure of one of the indicator lights of the towing vehicle or of the trailer then also leads to the change-over of the flasher pulse generator 114 to the generation of the higher frequency.

Figure 2:
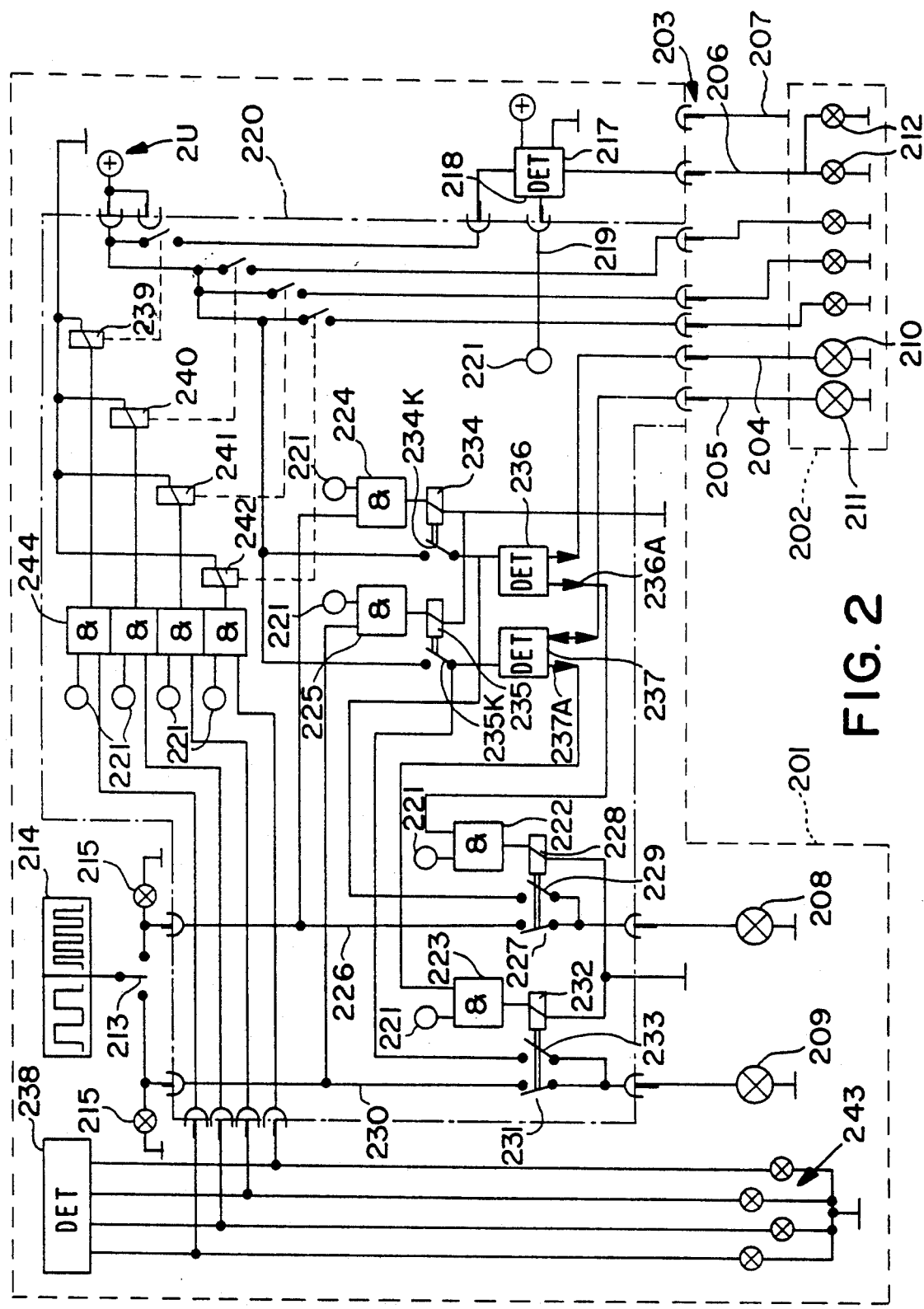
FIG. 2 is a schematic circuit diagram of a device according to the present invention.

Referring to FIG. 2, the circuit diagram of a switching device 220 constructed according to the present invention is provided for a towing vehicle 201 which is coupled to a trailer 202 both mechanically (not illustrated) and electrically via a customary multipin plug-in connection 203.

In FIG. 2 for the sake of simplification, only one rear right-hand indicator light 208 and one rear left-hand indicator light 209 of the towing vehicle 201 are illustrated. The front indicator lights have been omitted. The indicator lights 208 and 209 can be connected, as shown in FIG. 1, optionally via a manually switchable three-way switch 21 (direction signalling switch) having a neutral center position to the pulse output of a flasher pulse generator 214. A control lamp 215 is connected to a right-hand indicator light current path 226 and a left-hand indicator light current path 230, respectively. It is readily apparent that the wiring of the three-way switch 213 shown in FIG. 2, in which it has to connect the light load, is not the only possibility. In a known manner, relays or electronic switching means for discharging the contacts of the three-way switch can also be provided. In particular, clocked relays generate a state test which can be perceived even in the case of the failure of one of the control lamps 215.

The flasher pulse generator 214 is provided, as in FIG. 1, for the purpose of generating two different frequencies; a relatively low frequency being generated in the case of intact indicator lights, i.e. a nominal load or nominal current drain by the indicator lights, and a higher frequency being generated in the case of the failure of one or more indicator lights. The flasher pulse generator 214 thus also serves for the direct function monitoring of the towing vehicle indicator lights 208 and 209 as well as of the front indicator lights (not illustrated).

However, according to the invention, it is no longer necessary to change over the flasher pulse generator 214 to trailer mode. Correspondingly, despite the same functional mode as in the arrangement according to FIG. 1, in terms of the result, there is also no longer a signalling line provided between the flasher pulse generator 214 and a trailer detection device 217.

In fact, trailer detection device 217 detects the electrical connection of the trailer, likewise via a brake light current path 206, in an analogous manner to that described with reference to FIG. 1 (detection device 117).

However, a signal output 218 of the detection device 217 is connected to a node 221 which is represented by a circle in FIG. 2. The detection signal "trailer electrically connected" is switched to this node. Connected to the node 221 inside the switching device 220 are a number of inputs or AND gates 222, 223, 224 and 225 whose function is described below, circles 221 which symbolize the electrical connections to the node 221 also being drawn at these inputs for the sake of simplifying FIG. 2. With this illustration it becomes apparent that a trailer has to be electrically connected and electrically detected by the detection device 217 in order to connect through the AND gates 222 to 225 and to set their output levels to "HIGH." Of course, the correct functioning of at least one of the two brake lights is a prerequisite for the generation of the detection signal. The necessary voltage supplies of the AND gates are not illustrated for the sake of clarity.

It is evident that the detection signal "trailer connected" can also be logically processed within the switching device 220 in a different manner. The indicated AND gates are only a particularly simple and advantageous illustration of many equivalent possibilities. For example, negative switching logic can also be used.

Looped into the current path 226 from the right-hand fixed contact of the three-way switch 213 to the right-hand indicator light 208 is a normally closed or break contact 227 of a relay 228 which can switch a make contact 229 in addition to the break contact 227. The relay 228 is connected to the output of the AND gate 222 and is activated when its output level is switched to "HIGH."

Looped into the current path 230 from the left-hand fixed contact of the three-way switch 213 to the left-hand indicator light 209 is a normally closed or break contact 231 of a relay 232 which can switch a make contact 233 in addition to the break contact 231. The relay 231 is connected to the output of the AND gate 223 and is activated when its output level is switched to "HIGH." A high-impedance second input of the AND gate 224 is connected to the current path 226 from the right-hand fixed contact of the three-way switch 213 to the right-hand indicator light 208.

A high-impedance second input of the AND gate 225 is connected to the current path 230 from the left-hand fixed contact of the three-way switch 213 to the left-hand indicator light 209.

The electrical loading of the flasher pulse generator 214 through the AND gates 224 and 225 is negligible with respect to the indicator lights 208 and 209 due to the high-impedance inputs of the gates.

Connected to the output of the AND gate 224 is a relay 234 having a make contact 234K which is connected on the one hand to the positive pole of a voltage supply 2U and on the other hand to a monitoring circuit 236 as well as to the make contact 229 of the relay 228.

The switching device 220 itself is also connected to the vehicle voltage of the towing vehicle 201 via the voltage supply 2U connected in a non-illustrated manner to the existing accumulator of the towing vehicle.

Connected to the output of the AND gate 225 is a relay 235 having a make contact 235K which is connected on the one hand to the positive pole of a voltage supply 2U and on the other hand to a monitoring circuit 237 as well as to the make contact 233 of the relay 232.

A line 204 to the right-hand indicator light 210 of the trailer 202 is connected to a first output of the monitoring circuit 236 and a line 205 to the right-hand indicator light 211 of the trailer 202 is connected to a first output of the monitoring circuit 237. A second output 236A of the monitoring circuit 236 is connected to the second input of the AND gate 222 and a second output 237A of the monitoring circuit 237 is connected to the second input of the AND gate 223.

It can be seen that the trailer indicator lights are isolated from the electrical load of the indicator pulse generator 214; they only load the voltage supply 2U and are switched only indirectly by the three-way switch 213 via the switching device 220.

With the trailer connected (detection signal or switching node 221 "HIGH") and upon switching on the three-way switch 213, one of the AND gates 224 and 225 is intermittently switched through in each case. The monitoring circuits 236 and 237, each having a separate voltage supply (not illustrated) within the switching device 220, are actuated intermittently via their input. The monitoring circuits 236 and 237 normally pass on the pulses, which are predetermined by the frequency generated by the flasher pulse generator 214, via their first output and the line 204 or 205 connected respectively thereto to the trailer indicator lights 210 and 211, respectively.

However, the monitoring circuits 236 and 237 additionally detect any failure of the indicator lights 210 and 211 connected downstream in each case because then no current flows via the line 204 or 205. In such a case, they set their second output 236A and 237A, respectively, which normally conducts the "LOW" level, to a "HIGH" level. In this manner, a fault switching signal is generated which initially only registers a failure of a trailer indicator light.

Of course, in each of the monitoring circuits 236 and 237, there is a pulse elongation stage or a timing element which prevents the fault switching signal from also being clocked, but which is not illustrated separately.

Further rear lights 243 of the vehicle, for example tail lights and brake lights, are illustrated in FIG. 2 which are operated via a light control device 238. On the failure of one of the connected lights 243, the device 238 generates a signal (in a manner not illustrated in greater detail) which is directed at the vehicle driver. Also not illustrated are the customary switches for the lights connected to the light control device 238.

Connected to each of the four indicated current paths between the light control device 238 and one of the lights is a branch line to a high-impedance input of one of four AND gates 244 via which in each case one relay 239, 240, 241 and 242 can be activated with one make contact each.

The electrical loading of the light control device 23 by the AND gates 244 is negligible with respect to the lights of the towing vehicle 201 because of the high-impedance inputs of said gates.

The respective second input of each of these four AND gates 244 is electrically connected in turn to the node 221 (circular symbols) so that the relays 239 to 242 can also only be switched in the presence of the detection signal.

The make contacts of these relays 239-242 are connected on the one hand directly to the positive pole of the voltage supply 2U and on the other hand to lights provided in the trailer 202. For example, the brake lights 212 of the trailer 202 are switched via the relay 239 and the detection device 217 simultaneously with the brake lights of the towing vehicle, etc.

The light control device 238 is arranged in the front region of the towing vehicle 201. It also serves for monitoring the headlights (not illustrated) and parking lights while the branch lines can branch-off in the direct vicinity of the rear lights from the respective current paths.

The switching device 220 is also accommodated in the rear part of the towing vehicle 201 so that the indicator light current paths 226 and 230 only have to be interrupted in the vicinity of the indicator lights 208 and 209 in order to include them in the loop.

Finally, it should be noted that the simultaneous operation of all the indicator lights for the sake of providing hazard warning flashing is also possible. For this purpose, the two current paths 226 and 230 are connected simultaneously (in a manner not illustrated) to the flasher pulse generator 214 which, in turn, automatically uses a separate nominal load as the basis for this operating mode.

The indicator lights 210 and 211 of the connected trailer 202 then flash at the same time.

The operation of the aforementioned fault switching signal in the illustrated device according to the present invention is now clarified below with reference to a case example of a "failure of the left-hand trailer indicator light 211."

Upon switching the three-way switch 213 onto its left-hand fixed contact, the towing vehicle indicator light 209 is switched on to indicate turning and the AND gate 225 is connected through intermittently because the node 221 is applied with the detection signal and conducts the logic level "HIGH." Correspondingly, the output level of this AND gate 225 oscillates between "LOW" and "HIGH," and the relay 235 of the auxiliary switching device is clocked.

The monitoring circuit 237 which is clocked on the input side now detects the aforesaid light failure. It sets its second output 237A, connected to the one input of the AND gate 223, to a "HIGH" level and thus generates its fault switching signal. Since, as already mentioned, the AND gate 223 is also connected by the other input to the node 221, on the present failure of the trailer indicator light 211 to be switched on the gate 223 is connected through by means of the fault switching signal. The gate 223 sets its output level to "HIGH" so that the relay 232 connected downstream is activated.

The break contact 231 of the relay subsequently isolates the rear left-hand towing vehicle indicator light 209 from the electrical load of the flasher pulse generator 214 and simulates its failure with the interruption of the current path 230.

The flasher pulse generator 214 now automatically changes over to the higher "failure signal" frequency which can be seen by reference to the left-hand control lamp 215.

At the same time as the opening of the break contact 231, the make contact 233 of the relay 232 was closed. The make contact 233, as already mentioned, is connected to the supply voltage 2U via the make contact 235K of the relay 235 currently clocked with the higher frequency of the flasher pulse generator 214.

Therefore, the indicator light 209 is now intermittently switched on "on an auxiliary basis" via the relay 235 and its make contact 235K so that the failure of the trailer indicator light becomes clearly apparent when the driver looks, whose attention is drawn to the control lamp flashing more rapidly than usual.

Since the device is of identical design for both (right-hand and left-hand) indicator lights the description of a case example for a "failure of the right-hand trailer indicator light 210" is similar.

The arrangements including AND gate 224, relay 234 with make contact 234K and AND gate 225, relay 235 with make contact 235K are to be considered in each case to be auxiliary switching devices with which the trailer indicator lights and also the intermittent operation of the indicator light simulated as failed are maintained via the respective relay make contact 229 and 233.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method for monitoring directional trailer indicator lights of a vehicle trailer on a towing vehicle wherein on a failure of a trailer indicator light, an imminent failure signal is generated in the towing vehicle by a significant change in a pulse frequency generated by a flasher pulse generator upon the switching on of a direction signalling switch when an electrical load of the flasher pulse generator, connected through the direction signalling switch, deviates from its nominal load, the method comprising the steps of:

operating the trailer indicator lights via an auxiliary switching device clocked with the pulse frequency of the flasher pulse generator, the trailer indicator lights being the load of a separate voltage supply, generating a fault switching signal, with the direction signalling switch switched on, by a trailer indicator lights monitoring circuit on the electrical detection of said failure of one of said trailer indicator lights, said trailer indicator lights monitoring circuit not being connected to the electrical load of the flasher pulse generator, electrically isolating at least one indicator light of the towing vehicle from the electrical load of the flasher pulse generator in the presence of the fault switching signal for the purpose of simulating a deviation of the electrical load of the flasher pulse generator from the nominal load, and auxiliary operating said at least one isolated indicator light via said auxiliary switching device.

2. A device for monitoring directional trailer indicator lights of a vehicle trailer on a towing vehicle having indicator lights comprising:

a flasher pulse generator for generating fixed clock pulse frequencies which can be changed-over as a function of its electrical load, said electrical load being connected via a direction signalling switch and being formed by at least said trailer indicator lights, a detection device for detecting whether said vehicle trailer is connected to said towing vehicle and generating a corresponding electrical detection signal, a switching device controllable by said corresponding electrical detection signal for automatically controlling said flasher pulse generator in order to change-over the fixed clock pulse frequencies upon a failure of one of said trailer indicator lights, a display device for displaying an imminent failure signal generated by said change-over, wherein said switching device includes:
   a clocked auxiliary switching means connecting said trailer indicator lights to a separate voltage supply, said clocked auxiliary switching means being switched on by said direction signalling switch in the presence of said electrical detection signal;

a monitoring circuit for the trailer indicator lights for detecting the failure of one of said trailer indicator lights in the presence of said electrical detection signal and for generating a corresponding fault switching signal;

means for electrically isolating at least one of said indicator lights from the electrical load of said flasher pulse generator upon the switching on of said direction signalling switch and in the presence of said fault switching signal, said isolating means operating at the same time as the failure of one of said trailer indicator lights occurs;

wherein said flasher pulse generator is controlled so as to change-over the fixed clock pulse frequencies; and means for electrically connecting said isolated indicator light to said separate voltage supply via said auxiliary switching means.

3. A device according to claim 2, wherein said auxiliary switching means is pulsed directly by said flasher pulse generator in the presence of the electrical detection signal.

4. A device according to claim 3, wherein said switching device further comprises:

current paths coupling said indicator lights and said directional signalling switch and conducting an indicator light load of said flasher pulse generator;

wherein said auxiliary switching means have high impedance inputs connected to said current paths and a further input which can receive said electrical detection signal;

wherein said auxiliary switching means includes a first set of logic components for logically connecting a switch on state of one of said current paths with said electrical detection signal and providing an output signal for said auxiliary switching means.

5. A device according to claim 4, wherein said first set of logic components are AND gates and wherein said auxiliary switching means further comprises relays connected to said output signal of said AND gates, respectively, and being switchable by said output signals, said relays each including a make contact looped in series between said separate voltage supply and one of said trailer indicator lights.

6. A device according to claim 5, wherein said monitoring circuit is separately arranged between said make contacts and said trailer indicator lights.

7. A device according to claim 2, wherein said isolating means includes:

break contacts located in current paths between said flasher pulse generator and said indicator lights, said break contacts being switched in the presence of the fault switching signal; and make contacts connected to said auxiliary switching means and said indicator lights, respectively and which can be switched at the same time as said break contacts.

8. A device according to claim 6, wherein said isolating means includes:

break contacts located in current paths between said flasher pulse generator and said indicator lights, said break contacts being switched in the presence of the fault switching signal; and make contacts connected to said auxiliary switching means and said indicator lights, respectively and which can be switched at the same time as said break contacts.

9. A device according to claim 7, wherein said switching device further comprises a second set of logic components for logically connecting said electrical detection signal with said fault switching signal; and isolating relays having isolating break and make contacts controlled by said second set of logic components for actuating in each case one of said isolating break contacts and one of said isolating make contacts.

10. A device according to claim 8, wherein said switching device further comprises a second set of logic components for logically connecting said electrical detection signal with said fault switching signal; and isolating relays having isolating break and make contacts controlled by said second set of logic components for actuating in each case one of said isolating break contacts and one of said isolating make contacts.

11. A device according to claim 9, wherein said second set of logic components are AND gates.

12. A device according to claim 10, wherein said second set of logic components are AND gates.

13. A device according to claim 5, wherein said isolating make contacts of the isolating relays are connected in series in each case with said make contacts of said relays of said auxiliary switching means.

14. A device according to claim 9, wherein said isolating make contacts of the isolating relays are connected in series in each case with said make contacts of said relays of said auxiliary switching means.

15. A device according to claim 11, wherein said isolating make contacts of the isolating relays are connected in series in each case with said make contacts of said relays of said auxiliary switching means.

16. A device according to claim 7, wherein said isolating make and break contacts which are simultaneously switchable are combined to form in each case a single three-way contact.

17. A device according to claim 9, wherein said isolating make and break contacts which are simultaneously switchable are combined to form in each case a single three-way contact.

18. A device according to claim 13, wherein said isolating make and break contacts which are simultaneously switchable are combined to form in each case a single three-way contact.

* * * * *